Sept. 10, 1968　　　　　C. A. MIONE　　　　　3,400,789
DISC BRAKE FRICTION PAD AND DISC BRAKE SYSTEM
Filed July 1, 1966　　　　　　　　　　　　3 Sheets-Sheet 1

INVENTOR.
CARLO A. MIONE
BY Ralph L. Massino

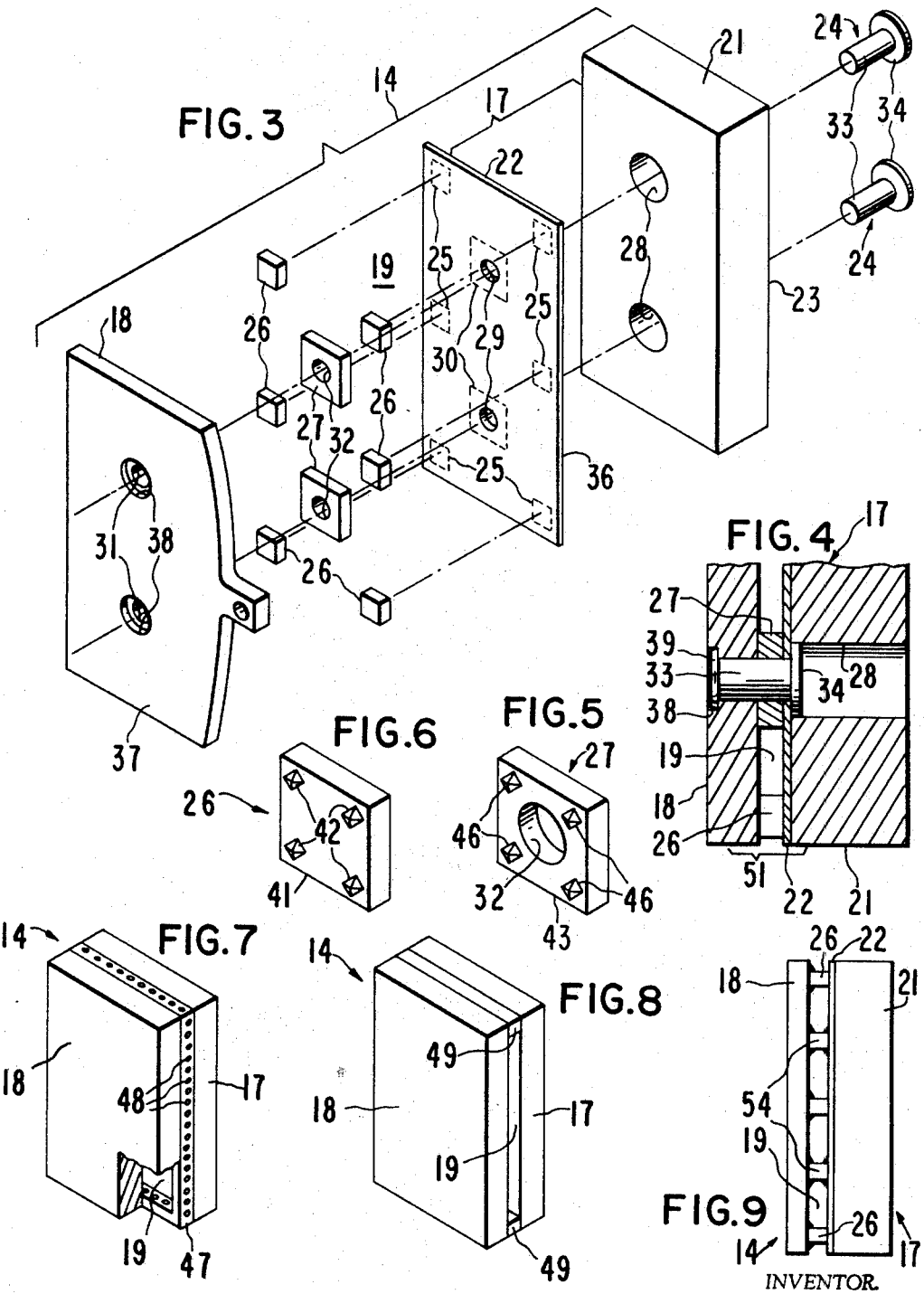

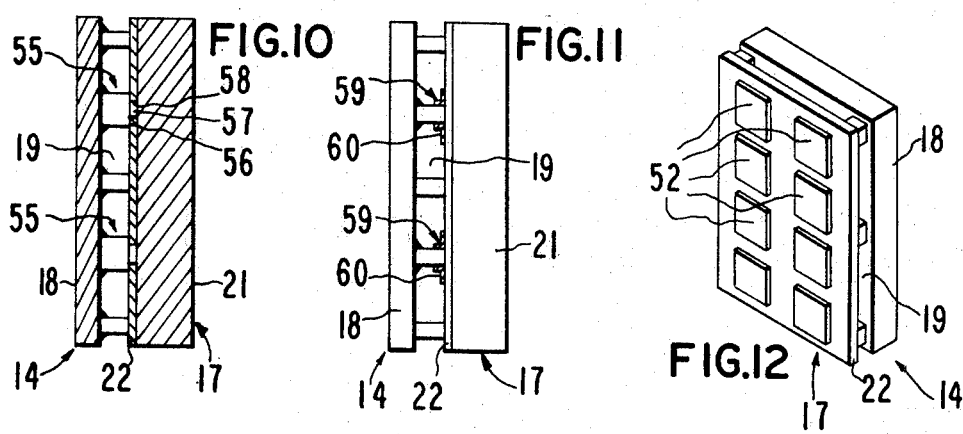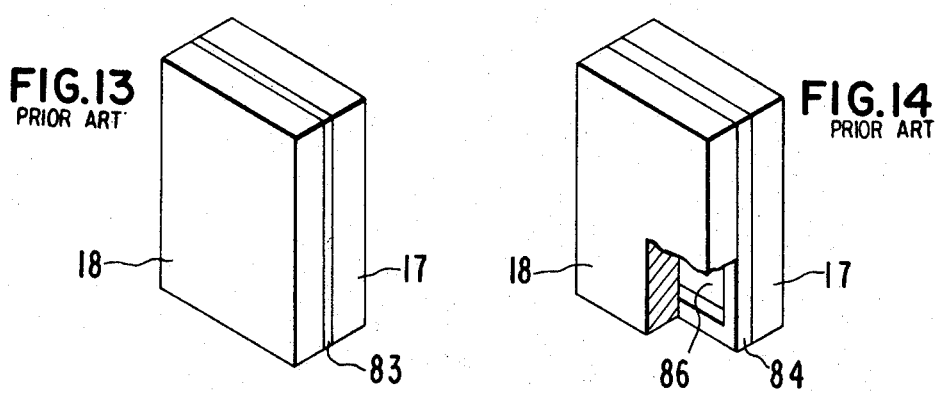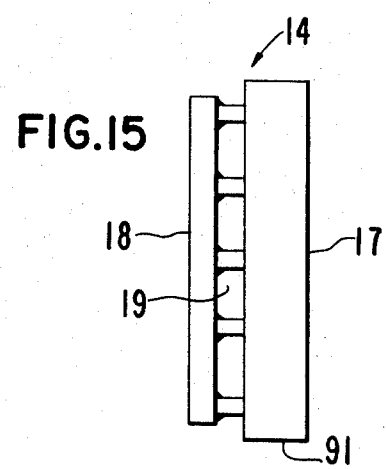

3,400,789
DISC BRAKE FRICTION PAD AND DISC
BRAKE SYSTEM
Carlo A. Mione, San Leandro, Calif., assignor to Ralph
L. Mossino, Foster City, and Harry E. Aine, Palo Alto,
Calif.
Filed July 1, 1966, Ser. No. 562,292
25 Claims. (Cl. 188—264)

ABSTRACT OF THE DISCLOSURE

A friction pad assembly includes a pad of metallic brake lining friction material supported by pedestals spaced from a base plate to define an air space between the base plate and pad of friction material vented to the assembly's surroundings. The assembly is positioned between a disc and actuator of a disc brake system.

The present invention relates generally to an improved disc brake friction pad assembly and a disc brake system. More particularly it relates to a friction pad assembly and a disc brake system which are particularly suited for use where severe braking conditions are encountered.

As is well known by those familiar with the sport of auto racing, on the average, about fifty percent of the racing cars which fail to finish a race are forced out for reasons directly growing out of brake failure. Almost all competition racers employ a caliper-type disc brake system. These brake systems include a rotatable brake disc coupled to stop a wheel when disc brake friction pads are urged by hydraulically actuated pistons against the braking face of the brake disc. Under severe braking conditions, i.e., often repeated or prolonged braking operations such as encountered in competition racing, extremely high temperatures, in many cases exceeding 1000° F., are produced at the interface formed by the engaged braking faces of the friction pad and brake disc. When these high temperatures exceed the permissible operating temperature of the brake system, problems of temporary brake failure and, in some cases, permanent brake damage are encountered.

The most prominent causes of brake failures encountered in competition racing are, what commonly are referred to as, "brake fade" and "fluid boiling." Brake fade occurs when the temperature at the interface of the braking faces exceeds the permissible operating temperature of the braking faces thereby causing a substantial reduction in the coefficient of friction between the friction pad and the brake disc. As a result of this substantial reduction in the coefficient of friction, the friction forces generated at the braking interface will not be sufficient to bring the vehicle to a normal rapid stop.

Fluid boiling occurs when the hydraulic fluid of the hydraulically actuated piston system is heated to its boiling temperature by the transfer of heat thereto from the braking face of the friction pad. As a result of boiling the fluid, gas pockets are produced in the fluid which, under the influence of the hydraulic pressure generated by the master cylinder during braking operation, compress to thereby absorb the forces intended to actuate the pistons to urge the friction pads against the brake disc.

In those cases where extremely severe braking conditions are encountered, the temperatures produced at the braking faces of the brake disc and friction pad may greatly exceed the rated permissible operating temperature of the brake lining material of the friction pad. In such cases, it has been found that the braking face of the friction pad becomes glazed thereby permanently damaging the friction pad.

Various techniques have been tried in attempting to prevent brake fading and fluid boiling in disc brake systems. Generally, however, either they have not been able to prevent such cases of brake failure under all braking conditions encountered, especially extremely severe ones, or they have been unsatisfactory for practical applications, especially with respect to caliper-type disc brake systems used in competition racing cars. For example, some disc brake systems employ liquid coolant circulated through the system to cool and carry away heat generated by the engaged friction pad and brake disc, for example as described in U.S. Patent No. 2,844,230. Such systems require specially constructed brake system components in order to convey the coolant, and also apparatus for circulating the coolant. Consequently, the systems are exceedingly more complex and expensive to construct than standard caliper-type automobile disc brake systems. Furthermore, the weight of such cooling systems makes the brake system unattractive for use in light weight competition racing cars.

In prior art ring-type disc brake systems commonly used in aircraft and heavy duty machinery, for example, as described in U.S. Patent No. 3,010,543, heat insulating members have been sandwiched between the lining material of the friction pad and its base plate in order to prevent heat flow from the braking face of the friction pad to the hyydraulic fluid. In the above noted patent, the insulating member defines a dead air space between the lining material and base plate. Although the insulating member and, in the case of the above noted patent, the dead air space will retard the flow of heat to the hydraulic fluid, the friction pad lining and brake disc remain at high operating temperatures. Hence, under severe braking conditions, it is possible for the temperature of the insulating member eventually to reach the ambient temperature of the friction pad lining. Consequently, it is also possible to heat the hydraulic fluid of the brake system to its boiling point when the ambient temperature of the friction pad lining exceeds the boiling point temperature.

Because of the aforementioned heat transfer problems, non-metallic, generally organic, friction pad lining materials are used in caliper-type disc brake systems of competition racing cars.

Although organic lining materials do not conduct heat as readily as the metallic lining materials, they conduct enough heat to boil the hydraulic fluid. Furthermore, the coefficient of friction temperature characteristic of organic lining materials is such that at temperatures in excess of 700 to 800° F., the coefficient of friction of organic lining materials becomes too low for the lining to function properly. Consequently, brake systems employing such friction materials are susceptible to brake fading and glazing at relatively low temperatures. On the other hand, metallic brake lining materials are capable of functioning properly at temperatures as high as 1300 to 1400° F.

Considerable advantage is therefore to be gained by the provision of a disc brake friction pad assembly and disc brake system which can function free of brake fade or fluid boiling problems even under severe braking conditions. Other advantages will be realized where a friction pad assembly capable of functioning under severe braking conditions is provided which can be used in presently available caliper-type disc brake systems without modifying the disc brake system.

The present invention provides such a friction pad assembly and disc brake system. More specifically, the friction pad assembly comprises a friction pad supported spaced apart from a base plate whereby free and continuous circulation of air through the space is allowed. As will become more apparent from the detailed description to follow, the vented space between th friction pad and base plate of the assembly enables the brake system in which it is used to function under extremely severe braking conditions free of brake fading or fluid boiling.

The disc brake system of the present invention is a caliper-type disc brake system employing a friction pad assembly having a friction pad supported from a base plate to define a vented air space therebetween. To prevent friction pad assembly structural failure during braking operations, the edge portions of the friction pad and base plate urged against the caliper housing during braking operations are constructed so that the friction pad edge portion impacts against the caliper housing either simultaneously with or before the base plate is restrained from further movement.

Accordingly, the object of the present invention is to provide a disc brake system which is able to function properly during severe braking conditions.

More particularly, it is the object of this invention to provide a disc brake friction pad assembly which enables the brake system in which it is employed to function free of brake fading and fluid boiling even under severe braking conditions.

Another object of this invention is to provide a disc brake friction pad assembly which prevents the occurrence of brake fading and fluid boiling that can be incorporated into standard disc brake systems without requiring any modification thereof.

A further object of this invention is to provide a disc brake friction pad assembly which prevents the occurrence of brake fading and fluid boiling without impairing the structural integrity of the disc brake system.

Still another object of this invention is to provide a disc brake friction pad assembly for use under severe braking conditions which is capable of employing a metallic friction lining material without promoting conditions favorable to fluid boiling.

Yet another object of this invention is to provide a caliper-type disc brake system free of brake fading and fluid boiling under the severest of braking conditions.

These and other objects and features of the present invention will become apparent from the following description and claims considered together with the accompanying drawings of which:

FIGURE 3 is an exploded perspective view of one embodiment of the vented friction pad assembly of the present invention.

FIGURE 4 is a fragmentary sectional view of the vented friction pad assembly of FIGURE 3 as assembled.

FIGURE 5 is a perspective view of an apertured pedestal employed in th evented friction pad assembly.

FIGURE 6 is a perspective view of a pedestal employed in the vented friction pad assembly.

FIGURE 7 is an illustration of another embodiment of the vented friction pad assembly.

FIGURE 8 is an illustration of yet another embodiment of the vented friction pad assemby.

FIGURE 9 is an illustration of a further embodiment of the vented friction pad assembly.

FIGURE 10 is an illustration of yet a further embodiment of the vented friction pad assembly.

FIGURE 11 is an illustration of still a further embodiment of the vented friction pad assembly.

FIGURE 12 is an illustration of still another embodiment of the vented friction pad assembly.

FIGURE 13 is an illustration of a friction pad assembly of the prior art having an insulating sheet sandwiched between its friction pad and base plate.

FIGURE 14 is an illustration of a friction pad assembly of the prior art having an annular insulator sandwiched between its friction pad and base plate.

FIGURE 15 is an illustration of a further embodiment of the vented friction pad assembly.

Figure 1:
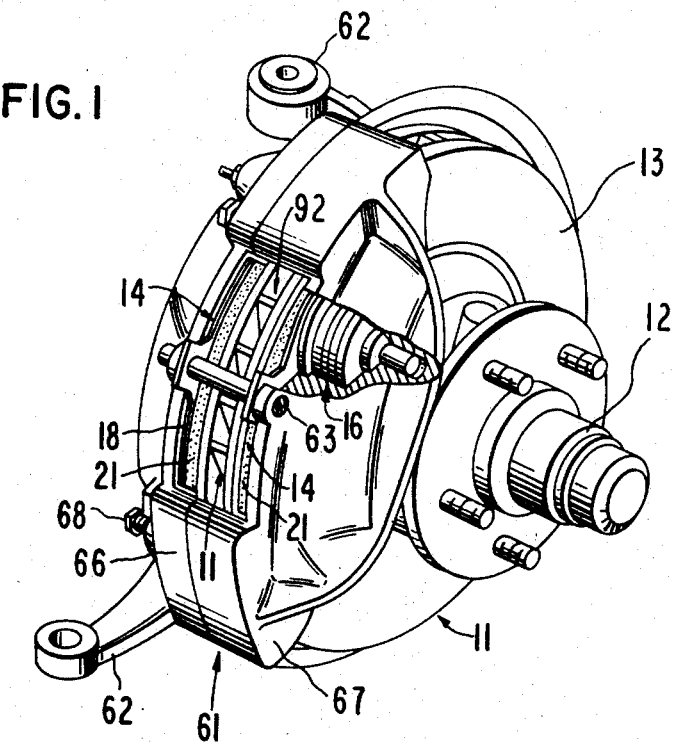
FIGURE 1 is a perspective, partially sectional view of a caliper-type disc brake system employing a vented friction pad assembly.
Figure 2:
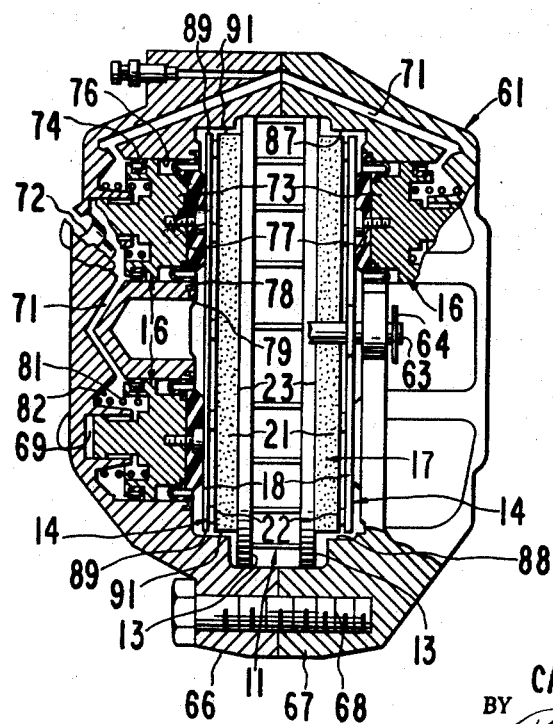
FIGURE 2 is a plan partial cross sectional view of the disc brake system of FIGURE 1.

With reference to FIGURES 1 and 2, standard disc brake systems, such as a caliper-type to be described in detail hereinbelow, include a rotatable brake disc 11 secured to rotate with a driven member such as, for example, wheel hub 12 of a vehicle. Generally, each side of the brake disc 11 defines a braking surface 13, the two braking surfaces generally being parallel. Braking is accomplished by means of a friction pad assembly 14 mounted opposite each braking surface 13 of the brake disc 11 to engage the braking surface when urged by a hydraulically actuated piston assembly 16.

In the present invention, the friction pad assembly 14 is constructed to allow air to circulate therethrough to thereby cool the friction pad assembly 14, and also to prevent heat transfer from the normally hot friction pad assembly 14 through the piston assemblies 16 to the hydraulic fluid. More specifically, referring to FIGURES 3 and 4, the friction pad assembly 14 of the present invention comprises a friction pad 17 supported spaced apart from a base plate 18 to define a space 19 therebetween vented to the assembly's surroundings. The vented space 19 allows air to freely circulate through the assembly 14. The circulating air contributes to the superior operation of disc brake systems employing the present friction pad assembly 14 in two significant ways. First, the air prevents conduction heat transfer from the friction pad 17 to the hydraulic fluid. Although the relatively low thermal conductivity of air serves to impede the heat transfer to the hydraulic fluid, by causing air to constantly flow through the vented space 19 whereby the heated air is carried away and replaced by cooler air, all significant heat transfer is prevented. Conduction of heat will take place from the friction pad 17 to the hydraulic fluid through the interconnecting support structure. However, the conduction can be, in the present invention, minimized by reducing the cross sectional area of the support structure to a small fraction of the area of the friction pad 17. More specifically, in a preferred embodiment of the present invention, the friction pad support area is limited to less than 25% of the area of the friction pad which is mutually opposed to the base plate 18. In addition, the support structure is preferably made of material having high strength at high temperature and having a relatively low thermal conductivity to inhibit the conduction of heat therethrough to the hydraulic fluid.

In tests conducted with a vented friction pad assembly 14 having a lining of metallic friction material, and constructed in accordance with FIGURE 3 and the parameters set forth hereinbelow, the disc brake system was subjected to repeated and prolonged braking operations, far in excess of those encountered even under the most severe competition racing conditions. The temperature of the hydraulic fluid of the brake system was measured and found not to have significantly changed.

Secondly, the circulating air and increased surface area of the friction pad assembly 14 relative to prior art friction pad assemblies provides for substantial cooling of the friction pad assembly 14 thereby reducing its ambient operating temperature. Cooling is accomplished by the transfer of heat from the hot friction pad 17 to the cooler air passing through the vented space 19, and by the increased radiation from the assembly 14 to its surroundings as a result of the increased surface area of the friction pad assembly 14. Because of this cooling, no brake fading was experienced during the aforementioned tests.

In constructing the friction pad assembly 14 for use in a caliper-type disc brake system, a lining 21 of brake friction material is bonded to a flat backing plate 22 preferably stainless steel. As noted hereinbefore, because of the vented space 19, any brake lining friction material can be used in constructing the disc brake friction pad assembly 14 of the present invention, e.g., organic, ceramic, metallic or combinations thereof. However, metallic is preferred because of its ability to function at high temperatures. A suitable metallic friction lining material is manufactured by the S. K. Welman Company of Bedford, Ohio under the trademark Velvetouch, and is supplied in the form of a friction pad with the metallic lining bonded to a backing plate by standard sintering techniques.

The lining 21 defines a braking surface 23 which conforms to the contour, generally flat, of the braking surface 13 of the brake disc which it is to engage. The friction pad 17 is supported spaced apart from the base plate 18, preferably of stainless steel, by pedestals 26 and 27 fastened to base plate 18. Where the pedestals 26 and 27 are not fastened to friction pad 17 but only provide a block-like support, they provide poor thermal conduction paths. To provide even support for the friction pad 17, pedestals 26 are welded to the base plate 18 to engage the friction pad 17 at locations 25 proximate the periphery thereof and pedestals 27 are welded to the base plate 18 to engage the friction pad 17 at locations 30 inwardly displaced from its periphery, the pedestals shown in phantom of their respective locations of friction pad 17 engagement. Preferably, the pedestals 26 and 27 are arranged to define triangular arrays of three pedestals.

In one embodiment, the friction pad is secured to the base plate 18 by providing lining 21, backing plate 22 and base plate 18 respectively with a pair rivet apertures 28, 29, and 31, each pair in registry with the other pairs and with the aperture 32 passing through the inwardly displaced pedestals 27. The apertures 29, 31, and 32 are adapted to receive therethrough the shank 33 of, for example, a #10 steel rivet 24, the rivets 24 securing the friction pad 17 to the base plate 18 spaced apart therefrom. The lining apertures 28 are larger than the apertures 29, 31, and 32 so that the head 34 of rivet 24 sits on the surface 36 of backing plate 22. (See FIGURE 4.) The surface 37 of base plate 18 distal friction pad 17 is counter bored at 38 to receive the roll 39 of the shank 33 when the friction pad assembly 17 is assembled. (See FIGURE 4.) Of course, in those cases where piston assemblies 16 do not engage the base plate 18 where the roll 39 appears or where the piston assemblies 16 are provided with a recess at its surface points to receive the roll 39, the base plate 18 would not have to be counter bored.

By joining the friction pad 17 to the base plate 18 at only the two locations 30 inwardly displaced from the periphery of the friction pad, the friction pad 17 and base plate 18 can experience different degrees of thermal expansion without deforming the friction pad braking surface 23. Furthermore, to insure that the braking surface 23 accurately conforms to the flat brake disc braking surface 13, the lengths of pedestals 26 and 27 are made the same.

To further minimize the conduction of heat from the friction pad 17 to the hydraulic fluid, pedestals 26 and 27 are secured to base plate 18 my projection welding techniques. With reference to FIGURES 5 and 6, a solid pedestal 26 and apertured pedestal 27 suitable for projection welding are shown. Solid pedestal 26 is a columnar member 41 having four uniform projections 42 at one end thereof. Apertured pedestal 27 also is a columnar member 43 having four uniform projections 46 at the end thereof for attachment to base plate 18. The columnar member 43 defines the rivet shank aperture 32. In assembling the friction pad assembly 14, the pedestals 26 and 27 are positioned with their respective projections 42 and 46 on base plate 18. When the pedestals are welded to the base plate 18, intimate contact between the pedestals and base plate only occurs at the projections. Hence, there is a greater thermal resistance to heat conduction than if the entire facing surface of the pedestals was intimately joined to the base plate 18.

FIGURES 7-11 illustrate some alternate vented friction pad assembly construction. For example, in FIGURE 7, an annular member 47 is sandwiched between friction pad 17 and base plate 18 to define space 19. Venting of the space 19 is provided by apertures 48 piercing the annular member 47. In FIGURE 8, friction pad 17 is maintained spaced apart base plate 18 to define the vented space 19 by bars 49, preferably extending in the general direction of the air flow. In both the embodiments illustrated in FIGURES 7 and 8, rivets could be employed to hold the friction pad assembly 14 together. In the embodiment of FIGURE 9, rivets 24 and apertured pedestals 27 are replaced by projections 54, each secured at their ends as by welding to the surface of backing plate 22 opposite lining 21 and to base plate 18. In this embodiment, no apertures need be provided in the friction pad assembly 14.

In FIGURES 10 and 11, vented friction pad assembly embodiments are shown which can be conveniently assembled and disassembled. In the embodiment of FIGURE 10, the friction pad 17 is positioned spaced apart from base plate 18 by pedestals 55 in place of rivets 24 and apertured pedestals 27. The pedestals 55 are secured, for example, by welding, to base plate 18. The end of each of the pedestals 55 distal base plate 18 defines a shoulder portion 56 and neck portion 57. Backing plate 22 is constructed to define recesses 58 for receiving the necks 57 snugly therein. The length of each neck 57 is adjusted to be slightly smaller than the depth of its associated recess 58. Hence, friction pad 17 will be supported at its backing plate 22 by shoulder 56 of pedestal 55. This is particularly important in those embodiments where the free end of neck 57 extends into the lining 21. Most friction pad lining materials are not strong enough to withstand the large compressive forces which are created at the contacting points with the interconnecting pedestal support structure during braking operations. Hence, a friction pad assembly constructed to have its friction pad 17 supported by pedestals 55 engaging its lining 21 will be more susceptible to structural failure than a friction pad assembly constructed to be supported at its backing plate 22 as described supra.

The embodiment of FIGURE 11 differs from that of FIGURE 10 in that receptacles 59 are provided having collars 60 to receive therein pedestals which extend from base plate 18. The receptacles 59 are secured as by welding to the surface of backing plate 22 facing base plate 18.

Although it appears that the friction pads 17 and base plate 18 of the friction pad assembly embodiments of FIGURES 10 and 11 could separate during use, referring to FIGURE 2, it is seen that there is very little freedom of movement in the caliper housing 61 in the direction of friction pad-base plate separation. Hence, the caliper housing 61 of the disc brake system serves to prevent such separation. To further insure against the possibility of friction pad-base plate separation in the friction pad assemblies illustrated in FIGURES 10 and 11, the depth of the recess 58 and the length of collar 60 of receptacle 59 are adjusted to be greater than the distance over which the friction pad assemblies can freely move in the caliper housing 61 in the direction of friction pad-base plate separation.

From the foregoing description of various vented friction pad assemblies, it is seen that the friction pad 17 can be constructed to be supported spaced apart from base plate 18 a number of ways. In all cases, the friction pad 17 has means to provide for fastening it to the base plate 18. In the embodiment of FIGURE 3, the friction pad 17 is constructed to define apertures 28 and 29 whereby rivets can be inserted for fastening the friction pad 17 to the base plate 18. In the embodiment of FIGURE 9, the backing plate 22 is provided with projections 54 for fastening the friction pad 17 to base plate 18. The friction pad assembly 14 illustrated in FIGURE 10 employs a friction pad 17 which defines recesses 58 for receiving pedestals extending from base plate 18. In the friction pad assembly 14 of FIGURE 11, receptacle 59 fastening means are provided for securing friction pad 17 to pedestals extending from base plate 18.

In constructing the vented friction pad assembly of the present invention, it is preferred that it be assembled so that the air in induced to flow turbulently through space 19. As is well known, under smooth or laminar flow conditions, as the moving stream of air flows past a heated surface, a film of air is formed immediately adjacent to the heated surface whose velocity varies from zero at the surface to the velocity of the main stream at its outer side. This air film has a high resistance to thermal conduction. Hence, the air film serves to impede the transfer of heat from the hot friction pad 17 to the cool air flowing through the space 19. However, if the air flow through space 19 is rendered turbulent, the film of air is disrupted whereby the transfer of heat from the friction pad 17 to the air flow is greatly increased over that which occurs under laminar air flow conditions. As a result of the increased heat flow caused by the turbulent air flow through the space 19, the friction pad 17 will be cooled more quickly to a lower ambient temperature thereby enabling the friction pad assembly 14 to function under braking conditions which could cause brake fading if laminar flow conditions existed.

One way of creating a turbulent air flow is to position obstacles in the path of the air flow. Pedestals 26 and 27 of the vented friction pad assembly illustrated in FIGURE 3 are obstacles which serve to perturb and thereby create a turbulence in the air flow through the vented space 19. Furthermore, it is believed that if the width of the space 19 is limited to less than ⅛ inch, any air flow through space 19 will be more turbulent than laminar in nature.

Many standard caliper-type disc brake systems employ friction pad assemblies having an overall thickness of ½ inch. By constructing the friction pad assembly 14 in accordance with the following parameters, for example, for a disc brake system of a 1965 Sting-Ray Corvette automobile, the friction pad assembly can be accepted in the brake system without modifying the system:

Overall thickness of friction pad assembly 14__in__  ½
Thickness of lining 21_____in__  19/64
Thickness of space 19_____in__  1/16
Thickness of backing plate 22_____in__  1/64
Thickness of base plate 18_____in__  ⅛
Dimensions of pedestal 26_____in. sq__  7/16
Dimensions of pedestal 27_____in. sq__  7/16
Mean width of friction pad assembly 14_____in__  2
Mean length of friction pad assembly 14_____in__  6

Construction of the vented friction pad assembly 14 of the present invention, for example, as illustrated in FIGURE 3, is accomplished by first cutting the friction pad 17 and base plate 18 to the desired size. The friction pad 17 and base plate 18 then are drilled to provide rivet shank apertures 29 and 31. The friction pad 17 is bored through lining 22 only to define apertures 28 which allow the head 34 of rivets 24 to be recessed to the backing plate 22 away from the braking surface 23 of lining 22. Of course, if the backing plate 22 is provided with projections such as in the embodiment of FIGURE 9 to secure it to the base plate 18, rivets 24 would not be needed, hence, it wouldn't be necessary to drill and bore friction pad 17 to provide apertures 28 and 29. Similarly, if the rivets 24 are replaced by such projections welded to base plate 18, it wouldn't be necessary to prove base plate 18 with apertures 29, nor would it be necessary to counter bore the base plate 18 at 38.

Where the roll 39 of rivet shank 33 must be recessed, the base plate 18 is counter bored at 38 to the necessary depth. The pedestals 26 and 27 are then welded to the base plate 18. If after welding the pedestals 26 and 27 to base plate 18, their lengths vary from one another by more than ±0.002 inch, the ends of the pedestals are surface ground until the lengths do not vary from one another by more than the noted tolerance. By constructing the pedestals 26 and 27 from high welding quality low carbon steel, normally, they will not experience any significant deformation during welding. Hence, by selecting the proper material for pedestals 26 and 27, the surface grinding step can be eliminated.

The rivets are then inserted through the friction pad 17 and rolled to tightly secure friction pad 17 to base plate 18. When constructing a preferred friction pad assembly 14 for use in a caliper-type disc brake system, the surfaces of friction pad 17 and base plate 18 which define the edges 51 (see FIGURE 4) which encounter the caliper housing during braking operations are surface ground to be in planar alignment.

Although the vented friction pad assembly 14 has been described with reference to having a full lining 21, and for use in a caliper-type disc brake system, it is not intended that the vented friction pad assembly 14 of the present invention be limited except by the terms of the appended claims. For example, with reference to FIGURE 12, it is seen that the friction pad 17 is constructed to have spots 52 of lining material bonded to the backing plate 22. Furthermore, the vented friction pad assembly of the present invention can be constructed in the form of a ring for use in aircraft or heavy duty machinery ring-type disc brake systems.

Referring again to FIGURES 1 and 2 the caliper-type disc brake system of the present invention includes the caliper housing 61 mounted by brackets (not shown) attached to or forming part of the steering knuckle 62 of the vehicle at a station along the path traveled by brake disc 11 to straddle the edge thereof. Two friction pad assemblies 14, for many vehicles generally oblong, are supported within housing 61, one opposing each braking surface 13, to engage the braking surfaces 13 of the brake disc 11 during braking operations. The assemblies 14 are prevented from being ejected from the housing 61 by a retaining means such as, retainer pin 63 and clips 64, which secure the friction pad assemblies 14 within the housing 61. Braking is accomplished by a hydraulically actuated piston assembly 16 contained within the housing 61 to urge each friction pad assembly 14 against the opposing braking surface 13 of brake disc 11.

Considering now a more detailed description of a caliper-type disc brake system constructed in accordance with the present invention, the caliper housing 61 comprises an inner caliper segment 66 joined to an outer caliper segment 67 by caliper bolts 68. The inner caliper 66 is juxtaposed the braking surface 13 facing away from wheel hub 12, or inwardly of the vehicle. The outer caliper 67 is juxtaposed the braking surface 13 facing towards the wheel hub 12, or outwardly of the vehicle. Each of the caliper segments 66 and 67 define two cylinder bores 69 for housing and guiding the hydraulically actuated piston assemblies 16. Hydraulic fluid is delivered to the cylinder bores 69 by interconnected internal fluid passageways 71 drilled in the caliper segments. Hydraulic fluid is introduced into the passageways 71 from the master brake cylinder system (not shown) at inlet 72.

Each piston assembly 16 comprises a piston 73 slideably disposed within the cylinder bore 69. An O-ring seal 74 is secured circumferentially about piston 73 towards the rear thereof to press against the walls 76 of the bore 69 in a liquid tight slideable relation. The O-ring seal 74 prevents the hydraulic fluid from escaping the hydraulic system and hence also from reaching the braking surfaces of the brak disc 11 and friction pad assembly 14.

At the forward end of piston 73 is mounted an insulator 77 which secures a flexible boot 78, usually rubber, circumjacent the piston 73. The boot 78 is fastened at the lip of the cylinder bore 69 by wedging the outer edge of the boot 78 into channel 79 circumjacent the bore opening. The boot 78 serves to retract piston 73 after the braking operation is terminated and to prevent foreign matter from entering the cylinder bore 69.

To minimize the brake pedal travel in applying the brakes, it is preferred to spring load the pistons 73 to urge the friction pad assemblies 14 into slight contact with the braking surfaces 13 of the brake disc 11. The spring loading is accomplished by a compression spring 81 inserted between back of the piston 73 and the end wall 82 of the cylinder bore 69.

In operation, the brake pedal is depressed by the operator of the vehicle. The depression of the brake pedal causes the master brake cylinder to generate an hydraulic pressure which forces the pistons 73 toward the brake disc 11. Since the pistons 73 bear against the friction pad assemblies 14, the assemblies are urged to engage the opposing braking surface 13 of the brake disc 11. When the pedal is released, the slightly stretched rubber boot 34 secured to each piston 73 retracts the piston 73, hence the friction pad assembly 17, to its home position.

As noted hereinbefore, when disc brake systems are used where severe braking conditions are encountered, often times the brakes will fail as a result of fluid boiling or brake fade. As can be seen in FIGURE 2, heat generated at the braking surface 23 of the friction pad assembly 14 is transferred through the pad assembly 14 and piston assembly 16 to the hydraulic fluid. To impede, and in the most desirable case, prevent such transmission of heat, the friction pad assembly 14 is constructed to have a vented air space thermal barrier between its braking surface 23 and its base plate 18 contacting the forward end of piston assembly 16. Referring to FIGURES 3-4 and 7-15, various types of friction pad assemblies are shown which impede or prevent the transmission of heat, and which are suitable for use in caliper-type disc brake systems as described supra. As can be seen from the figures, it is contemplated that the friction pad assembly 14 employed in the caliper-type disc brake system of the present invention will comprise a base plate 18, preferably flat, constructed of a rigid material such as stainless steel. A friction pad 17 including lining of suitable brake friction material is secured to the base plate 18. Defined between the base plate 18 and friction pad 17 is a vented air space thermal barrier. The vented air space thermal barrier is formed by the interconnecting support structure supporting friction pad 17 spaced apart from base plate 18 to define the vented space 19 of the vented friction pad assembly embodiments of FIGURES 3, 7-12 and 15. Other forms of thermal barriers as employed in prior art structures are shown in FIGURES 13 and 14. In the embodiment of FIGURE 13, the thermal barrier means is formed by an insulator plate 83 of, for example, ceramic or any conventional heat insulating material, sandwiched between a friction pad 17 and base plate 18. In FIGURE 14, an annular insulator 84 is held between the friction pad 17 and base plate 18 and together with the resulting dead air space 86 define the thermal barrier means.

Referring again to FIGURE 2, it is noted that as the friction pad assembly 14 is urged against the rotating brake disc 11, the assembly 14 tends to move towards one of the end walls 87 or 88 of housing 61, depending upon which direction the brake disc 11 is rotating. If the end edge 89 of base plate 18 encounters the end wall of housing 14 before the end edge 91 of friction pad 17, shear forces are created at the points at which the pad is fastened to the base plate 18 since the lining 21 tends to be carried by the rotating brake disc 11. These shear forces act to separate the friction pad 17 from the base plate 18. By constructing the friction pad assembly 14 so that end edges 91 of friction pad 17 extend beyond (see FIGURE 15) or so that they are in planar alignment with the end edges 89 of base plate 18, the destructive shear forces will be eliminated. The most preferred construction, is shown in FIGURE 2 where the end edges 89 and 91 of base plate 18 and friction pad 17 respectively are in planar alignment. In this preferred construction the shear forces are absorbed by the entire friction pad assembly 14.

Of course, the shear forces also could be minimized by constructing end walls 87 and 88 of housing 61 to have inwardly extending projections to receive the end edges 91 of friction pad 17 in preference to the end edges 89 of base plate 18. Hence, in order to eliminate the destructive shear forces, it is only necessary that the friction pad assembly 14 be constructed so that only the end edges 91 of friction pad 17 encounter the end walls 87 and 88 of housing 61 or so that the end edges 91 of friction pad 17 and end edges 89 of base plate 18 simultaneously encounter the end walls.

Although air enters the housing 61 as a skin layer of air carried by the rotating brake disc 11, in using the vented friction pad assembly in disc brake systems, it is preferred that the housing of the friction pad assembly, in the case of a caliper-type disc brake system, caliper housing 61, be provided with passageways for air to enter the housing. In the caliper housing 61, shown in FIGURES 1 and 2, air enters through top opening 92 and from the opening (not shown) at the bottom of the housing 61.

As noted hereinbefore, a disc brake system constructed in accordance with the present invention, especially when employing the vented friction pad assembly, will be less susceptible to brake failure. This is most important when it is considered that recent evidence indicates that a large percentage of automobile accidents on high speed highways occur as a result of brake failure due to brake fading and fluid boiling. Hence, the disc brake system and friction pad assembly of the present invention is also characterized by an extremely important safety feature.

While the present invention has been described with respect to specific embodiments, it will be apparent that numerous modifications and variations are possible within the scope of the invention. Hence, the present invention is not intended to be limited except by the terms of the following claims.

What I claim is:

1. A friction pad assembly for use in a caliper disc brake system including a caliper housing located at a station along the path traveled by a rotatable brake disc and through which the brake disc passes to be engaged at its braking face by the friction pad assembly retained by the housing and urged during braking operations by a hydraulically actuated piston means contained in the housing on the side of the friction pad assembly distal the brake disc comprising a base plate having a surface for engaging said piston means, and a friction pad including a lining of friction material for engaging said braking face of said brake disc supported spaced from said base plate at the side thereof distal the surface for engaging said piston means to define a space between said base plate and friction pad vented to the assembly's surroundings, said base plate and friction pad of a spot-type disc brake friction pad assembly configuration for engaging a brake disc at a station along the path traveled thereby.

2. The apparatus according to claim 1 wherein the spacing between said base plate and said friction pad is not greater than one-eighth inch.

3. The apparatus according to claim 2 wherein the surface area of said friction pad contacting said spacer means is less than 25% of the area of the friction pad facing said spacer means.

4. The apparatus according to claim 1 wherein said friction pad includes metallic friction lining material bonded to a backing plate.

5. The apparatus according to claim 1 wherein said base plate and said friction pad element have side edges for engaging the caliper housing during braking operations, said side edges of said base plate not extending beyond said side edges of said friction pad.

6. The apparatus according to claim 1 further including a plurality of pedestals having projections on one side thereof contacting said base plate to form a projection weld zone securing said pedestals to said base plate, said friction pad positioned to rest on the ends of said pedestals distal the base plate and secured to at least one of said pedestals whereby said friction pad is point supported spaced from said base plate, and wherein said friction pad includes metallic friction lining material.

7. The apparatus according to claim 6 wherein said pedestals are positioned on said base plate to engage said friction pad proximate the periphery thereof and at least at one location inwardly displaced from the periphery to support said friction pad evenly, said friction pad secured to said pedestals located inwardly displaced from the periphery thereof.

8. A disc brake system comprising a rotatable brake disc adapted to be coupled to a driven member, and having a braking face; a friction pad assembly mounted for movement toward and away from the braking face of said brake disc at a station along the path traveled by said brake disc, said friction pad assembly comprising a base plate having front and back sides, and a friction pad including a lining of friction material for engaging the braking face of said brake disc supported spaced from said base plate at its front side to define a space between the friction pad and base plate vented to the assembly's surroundings; and hydraulically operated piston means mounted to engage the back side of said base plate and urge said friction pad assembly toward said brake disc to bring said lining in friction contact with the braking surface thereof.

9. The apparatus according to claim 8 wherein said friction pad includes metallic friction lining material bonded to a backing plate.

10. The apparatus according to claim 8 further comprising a second friction pad assembly mounted for movement toward and away from a second braking surface of said brake disc opposite said first braking surface engaged by said first friction pad assembly in response to hydraulically operated piston means, said second friction pad assembly comprising a base plate and spaced apart friction pad arranged in the same manner as said first friction pad assembly.

11. The apparatus according to claim 10 further including a housing containing said hydraulically operated piston means and retaining said friction pad assemblies in position for urging towards and contacting said brake disc, and wherein each of said friction pad assemblies have edge portions defined by respective base plate and friction pad for engaging said housing during braking operations, the portions of said base member and friction pad of each friction pad assembly defining said edge portions in planar edge alignment.

12. The apparatus according to claim 11 wherein said housing defines a passageway for air flow therethrough.

13. The apparatus according to claim 8 further including a plurality of pedestals having projections on one side thereof contacting said base plate to form a projection weld zone securing said pedestals to said base plate, said friction pad positioned to rest on the ends of said pedestals distal the base plate and secured to at least one of said pedestals whereby said friction pad is point supported spaced from said base plate, and wherein said friction pad includes metallic friction lining material.

14. The apparatus according to claim 13 wherein said pedestals are positioned on said base plate to engage said friction pad proximate the periphery thereof and at least at one location inwardly displaced from the periphery to support said friction pad evenly, said friction pad secured to said pedestals located inwardly displaced from the periphery thereof.

15. A friction pad assembly for use in a disc brake system of the type including a rotatable brake disc having a braking face for engagement by the friction pad assembly which is positioned between the brake disc and means for urging the friction pad assembly and brake disc into engagement comprising a base plate having a surface for contacting said urging means, a friction pad including a lining of friction material for engaging the braking face of said brake disc, and means for supporting said friction pad spaced from said base plate at a side thereof opposite the surface for contacting the urging means to define a space between said base plate and friction pad vented to the assembly's surroundings.

16. The apparatus according to claim 15 wherein said lining of friction material is metallic, said support means is a plurality of pedestals having projections on one side thereof contacting said base plate to form a projection weld zone securing said pedestals to saide base plate, and said friction pad positioned to rest on the ends of said pedestals distal said base plate and secured to at least one of said pedestals whereby said friction pad is point supported from said base plate.

17. The apparatus according to claim 15 wherein said friction pad includes metallic friction lining material disposed on a backing plate.

18. The apparatus according to claim 15 wherein the spacing between said base plate and said friction pad is not greater than one-eighth inch.

19. The apparatus according to claim 15 wherein said friction pad is supported from said base plate by support structure whose cross sectional area contacting said friction pad is less than 25% of the area of the friction pad which is mutually opposed to said base plate.

20. The apparatus according to claim 15 further including means for rendering the air flowing through said vented space turbulent.

21. The apparatus according to claim 15 wherein said friction pad is point supported from said base plate.

22. The apparatus according to claim 21 wherein said support means includes a plurality of pedestals secured to said base plate, said friction pad positioned to rest on the ends of said pedestals distal said base member and secured to at least one of said pedestals whereby said friction pad is point supported from said base plate.

23. The apparatus according to claim 6 wherein said pedestals are steel and have projections on the side thereof contacting said base plate forming projection weld zones which secure the pedestals to said base plate.

24. The apparatus according to claim 22 wherein said pedestals are positioned on said base plate to engage said friction pad proximate the periphery thereof and at least at one location inwardly displaced from the periphery to render even support to said friction pad, said friction pad secured to said pedestals located inwardly displaced from the periphery thereof.

25. The apparatus according to claim 24 wherein said pedestals are arranged in triangular arrays of three pedestals.

References Cited

UNITED STATES PATENTS

| | | | |
|---|---|---|---|
| 2,684,744 | 7/1954 | Myers | 188—264 X |
| 3,010,543 | 11/1961 | Pear | 188—72 |
| 3,042,152 | 7/1962 | Butler | 188—152 X |
| 3,256,959 | 6/1966 | Eggstein | 188—73 |
| 3,275,105 | 9/1966 | Petit | 188—250 |
| 3,167,156 | 1/1965 | Davis et al. | 188—72 |

FOREIGN PATENTS 346,777   9/1960   Switzerland.

MILTON BUCHLER, *Primary Examiner.*

G. E. A. HALVOSA, *Assistant Examiner.*